July 14, 1959     W. E. RILEY     2,894,527
TWIN-ARCH PIPE LINE SPAN
Filed April 30, 1956     2 Sheets-Sheet 1
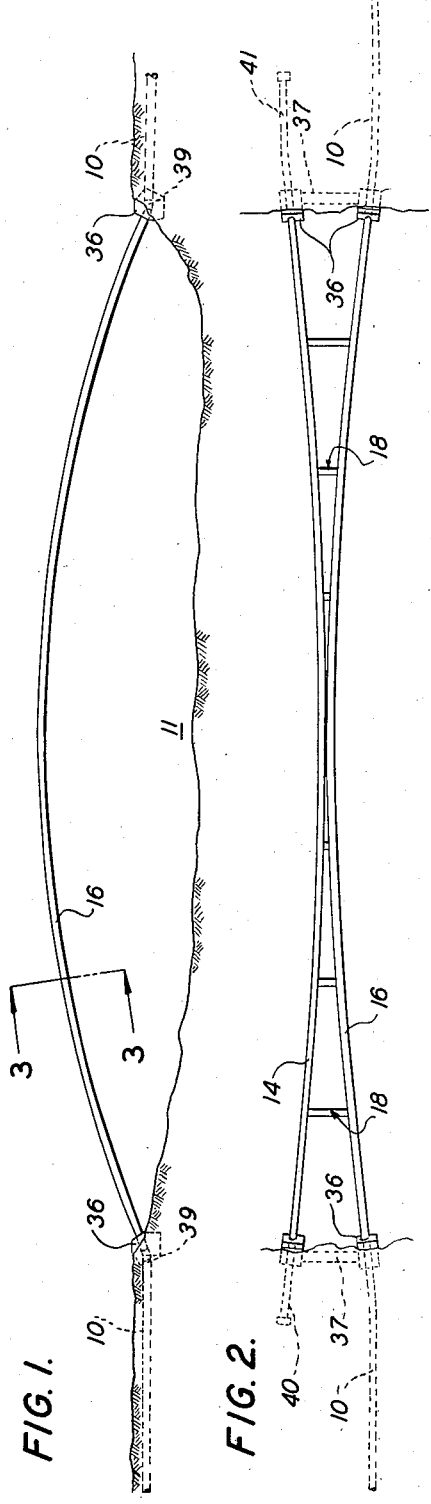
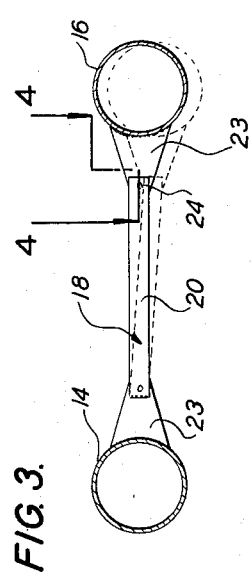
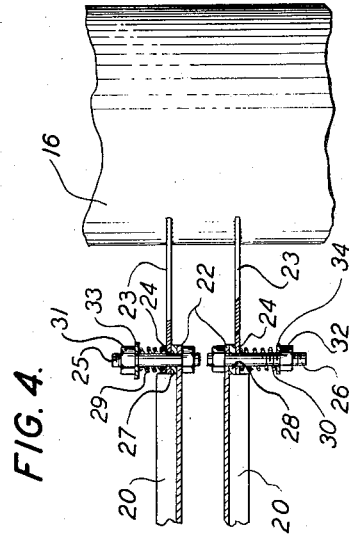
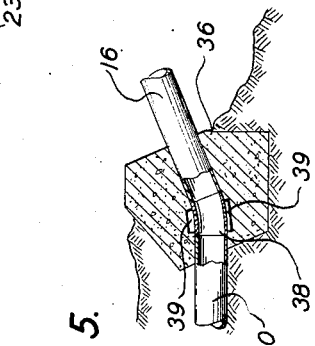
INVENTOR.
WALTER E. RILEY
BY
Christie, Parker & Hale
ATTORNEYS

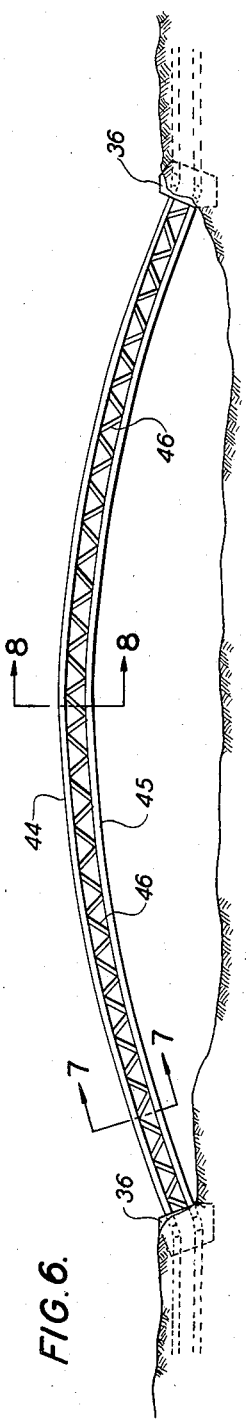
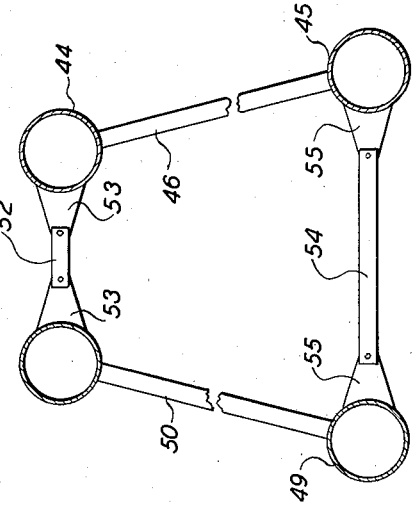
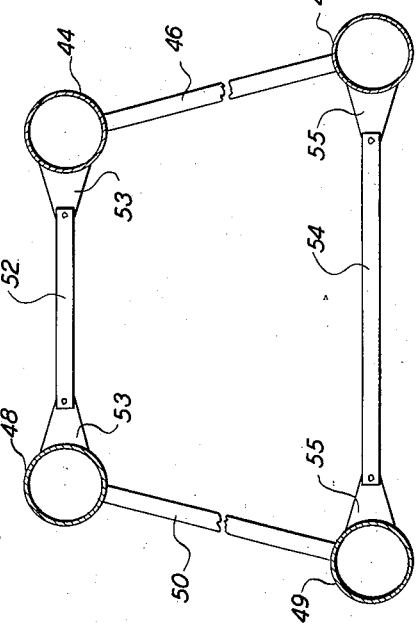
INVENTOR.
WALTER E. RILEY

2,894,527
TWIN-ARCH PIPE LINE SPAN

Walter E. Riley, Scottsdale, Ariz.

Application April 30, 1956, Serial No. 581,714

3 Claims. (Cl. 137—236)

This invention relates to improved spans for crossing an obstruction, say a river or a gorge, with a pipe line.

Pipe line crossings have been made on existing bridges adjacent the right of way, on special beam spans, on special suspension bridges, and by laying the line in a trench (say in a river bottom) and burying it.

Each of these arrangements has certain disadvantages. Ordinarily pipe lines are in open country and existing bridges cannot be utilized. Trenching is very expensive if the obstruction is water. Beam spans are expensive for long crossings because numerous piers are required. Suspension bridges are also expensive, because they require numerous cables and anchorages.

U.S. Patent No. 2,736,334 describes an improved pipe line span which minimizes the difficulties encountered with prior structures. The span of this patent includes two arched structures which are located side by side and connected together by struts or cross pieces to provide lateral stability to the two structures and yet permit relative vertical displacement between them. This is accomplished by connecting the struts to the respective pipes with horizontal pivots so that the pivots permit relative movement between the two pipes in the vertical direction while the struts maintain the relative spacing between the two pipes substantially fixed. Preferably, the two arched structures are inclined toward each other so that they are closer together in the center than at the ends of the arches.

In one embodiment of the patented invention, which is particularly suitable for short spans or for long spans in pipe lines which carry gases, the two arched structures are curved pipes.

In another embodiment of the patented invention, which is particularly suitable for long spans in which pipe lines are employed to transport heavy substances such as liquids or semi-solids, each of the two arched structures is formed of two pipes, both of which lie in the inclined plane of the arch. The two pipes of each of the arched structures are joined by braces which also lie in the plane of the arch.

In either of these embodiments, since relative vertical displacement is permitted between the arched pipes located side by side, the pipes may be employed to carry substances having different weights or temperature without creating excessive stresses.

On investigation of the spans described in the patent referred to above, I have discovered that they are sometimes susceptible to vibration when subjected to pulsating loading.

In controlling unwanted vibration in a structure, the three most important factors are the natural frequency of the structure, the magnitude and frequency of the exciting force, and the internal dampening capacity of the structure. The natural frequency of a structure is defined as that frequency at which the structure vibrates when a load is applied to the structure and suddenly released. If a load is periodically applied to a structure, the number of times per second the load is applied is called the frequency of the exciting force. The internal dampening capacity of a structure is defined as the amount of energy absorbed in vibrating. As long as the dampening capacity of a structure is greater than the energy put into it by a pulsating force, no harm is done; but if the dampening capacity is too small, the structure may resonate, i. e. vibrate at its natural frequency until it is destroyed. An example of this phenomenon was the failure of the suspension bridge at Tacoma, Washington, popularly called "Galloping Gertie."

Structures, such as the twin-arch pipe line span of this invention, may be subjected to pulsating forces in several different ways. For example, a walk-way may be provided on the structure, and a group of men walking across it in a cadence equal to the natural frequency of the span can create resonance, if the internal dampening capacity of the span is not sufficiently large. Another source of pulsating force is a steady wind blowing across the structure. When a horizontal wind blows across a pipe, whirls are created on the top and bottom of the pipe. These whirls detach themselves periodically depending on the velocity of the wind. When a whirl is detached, a definite force is exerted on the pipe. Since the whirls leave alternately, pulsating forces are applied to the pipe. If the frequency of these forces coincides with the natural frequency of the structure, and if the internal dampening capacity of the structure is exceeded by the energy applied by the wind, objectionable vibration of the structure will ultimately result.

This invention provides apparatus for adjusting the dampening capacity of the twin-arch pipe line span of the patent so that the dampening capacity can be made larger than any pulsating force which may normally be applied to the structure.

Briefly, the invention includes means for adjusting the internal friction in the pivots which permit the arched pipes to move vertically with respect to each other. By making the friction of the pivots sufficiently large, the span has adequate internal dampening capacity to overcome any pulsating force which normally may be encountered, and yet the pipes are still capable of moving vertically with respect to each other.

In the preferred form of the invention, the distance between the arched pipes varies along the longitudinal direction of the pipes, thus preventing wind whirls on the leeward arch from coinciding with those on the windward arch. With this arrangement the arches cannot vibrate in unison, and therefore the arches are not deflected together, thereby permitting the friction in the pivots of the connecting struts to absorb the applied energy.

These and other aspects of the invention will be more fully understood from the following detailed description taken in conjunction with the accompanying drawings, in which:

Fig. 1 is a longitudinal elevation of one embodiment of the arched pipe span;

Fig. 2 is a plan view of the span of Fig. 1 showing the struts between the arches;

Fig. 3 is a sectional view taken on line 3—3 of Fig. 1 showing the construction of one of the horizontal struts and the manner in which it is connected to the pipes;

Fig. 4 is a view taken on line 4—4 of Fig. 3;

Fig. 5 shows how the span is supported at each end by abutment;

Fig. 6 is a longitudinal elevation of another embodiment of the arched pipe span;

Fig. 7 is a sectional view taken along line 7—7 of Fig. 6; and

Fig. 8 is a sectional view taken along line 8—8 of Fig. 6.

Referring to Figs. 1 and 2, a pipe line 10 extends from each side of a channel 11 which is an obstruction to be crossed by the pipe line.

The twin-arch span for crossing the channel includes a pair of pipes 14 and 16 which are formed in the shape of arches having the same curvature. The pipes 14 and 16 may be composed of a plurality of sections which are joined end to end by welding, by threaded joints, or by bolted joints. The two arched pipes are inclined toward each other so that the pipes are closer together at the center of the arches than at the ends, and the pipes are connected together at intervals by horizontal braces or struts 18, extending at substantially right angles to the direction of the pipe line.

As shown most clearly in Figs. 3 and 4, each strut includes a pair of laterally spaced, parallel channel beams 20, the beams being arranged to open in a horizontal direction away from each other. The flanges at each end of each channel beam are cut away, as shown most clearly in Fig. 4, and the ends of each pair of channel beams are provided with a horizontal bore 22. A vertical gusset 23 is welded to the outside of each of the arched pipes at the location of the strut, and the gusset has a horizontal bore 24 which matches the bore in the ends of the pair of channel beams.

A pair of bolts 25 and 26 extend through the respective end portions of the pair of channel beams and the adjacent gusset member, and a pair of washers 27 and 28, which may be composed of bronze or the like, are provided between the respective end portions of the pair of channel beams and the adjacent gusset member. Compression springs 29 and 30 are disposed around the respective ends of the bolts 25 and 26, and the springs are compressed by nuts 31 and 32 which bear against steel washers 33 and 34 on the bolts. The channel beams have sufficient flexibility so that they may be deflected slightly toward the gusset by tightening the nuts 31 and 32 and compressing the springs on the respective bolts.

Thus the two pipes are permitted to move vertically with respect to each other, and the amount of internal friction of the pivots of the struts is adjustable by tightening the nuts to place the compression springs under any desired degree of compression. In this manner the structure is given sufficient internal dampening to overcome any pulsating force which may be applied to the structure, but yet the friction in the pivots is low enough to permit necessary relative vertical movement between the pipes due to temperature variations or other conditions. For example, when the contents and the temperature of the two pipes are the same, the two arches have substantially the same height. However, when the contents of the two pipes have different weights or temperatures, one of the arches may be somewhat lower than the other, since relative displacement between the two pipes is permitted in the vertical direction. Such vertical displacement is shown in Fig. 3 by the dotted line position of the arcuate pipe 16 and strut 18.

If desired, the compression springs 29 and 30 may be omitted and the nuts 31 and 32 tightened to a predetermined torque value to place the pivot under the desired amount of friction. However, the arrangement shown in Fig. 4 is preferable because it has the advantage of absorbing any wear of the bearing surfaces due to the action of the springs with very little change in the internal friction of the pivot.

A single bolt and a single compression spring may be employed instead of the pair of bolts 25 and 26 and the pair of springs 29 and 30 if a rigid spacer is provided between the end portions of the pair of channel beams and if the gusset plates are somewhat flexible. However, it is preferable to employ a pair of bolts and a pair of springs as illustrated in Fig. 4 because ordinary channel beams are much more flexible than the gusset plates for such channel beams. Hence, springs of smaller size may be employed to force the end portions of the channel beams toward the adjacent gusset members, and the amount of friction can be controlled more precisely.

If the operating conditions are severe, the portion of the pipes to which the gussets are connected should have thicker walls than the other portion of the pipes to compensate for the stress concentration where the gussets are welded to the pipes.

As shown in Fig. 6, the ends of the arcuate pipes are supported by suitable abutments 36, which are cast around the ends of the pipes. Struts 37 (Fig. 2) are employed between adjacent abutments to distribute lateral loads unless the abutments are located in solid rock, in which case the struts 37 are unnecessary. Each of the abutments has a hole in it which accommodates a separate elbow 38 connected to each end of the arcuate pipes. Preferably each of the elbows has a plurality of ribs 39 welded to it so that the ribs extend parallel to the pipe line and are equally spaced around the circumference of the elbow. These ribs help to transmit some of the thrust of the arch into the abutment.

As shown in Figs. 1 and 2, the elbows which are connected to the arcuate pipe 16 are also connected to the pipe line 10 so that the arcuate pipe 16 is part of the pipe line. The other two elbows are connected to short sections of pipe 40 and 41 which may be connected to another pipe line at a subsequent time if desired.

In the arrangement shown in Fig. 2, a considerable portion of the thrust of the arches may be supported by the pipe line, thus permitting the use of relatively small abutments.

The twin-arch span shown in Fig. 1 is particularly suitable for short spans, or for long spans in pipe lines which are employed to transport gases. When the transported medium is a liquid or a semi-solid, an unbalanced loading condition results when the medium first enters the arch because it must rise to the top of the arch before the far side of the arch is loaded. Such partial loading of the arch creates stresses which are excessive for long arches.

By utilizing two structures of the type shown in Fig. 1 with one located above the other, and with the two structures tied together with braces, the resulting span is capable of withstanding partial loading and long spans of this type may be used for transporting heavy substances such as liquids or semi-solids. The dampening device of this invention is also applicable to such a structure.

A span employing four arched pipes is shown in Figs. 6 through 8. In the twin-arch structure shown in these figures, each of the two arched structures is formed of two pipes which are tied together with bracing. One of the arched structures includes arcuate pipes 44 and 45 tied together by upright bracing 46. The other arched structure includes arcuate pipes 48 and 49 tied together with upright bracing 50.

Preferably both the top and bottom pipes and the bracing which form each of the arched structures lie in the inclined plane of the respective arches. Also it is preferable that the spacing between pipes 44 and 45, and the spacing between pipes 48 and 49, be the same at the ends of the span as in the center as shown in Figs. 7 and 8.

Pipes 44 and 48 are connected together by lateral struts 52 which are pivoted at each end to gussets 53 in the manner shown in Fig. 4. Pipe 45 is connected to pipe 49 by lateral struts 54 which are also pivoted at each end to gussets 55 in the manner shown in Fig. 4. Thus pipes 44 and 45 are free to move vertically with respect to pipes 48 and 49, yet the pivots provide sufficient internal dampening between the two arches to prevent the structure from resonating.

The ends of the span of Figs. 6 through 8 are supported by abutments 57 in a manner similar to that shown for the span of Figs. 1 through 5.

I claim:

1. In a pipe line span for crossing an obstruction including a pair of curved pipes extending across the obstruction and disposed in the form of adjacent arches to be vertically movable with respect to each other, at least one strut extending between the two pipes and having a horizontal transverse bore in each end, a separate mounting plate on each pipe adjacent a respective end of the strut, each plate having a bore adapted to register with a respective bore in the strut, and a separate linking member in each bore at each end of the strut and in a respective bore in a plate which connect the two pipes together to form a system having one internal dampening capacity and natural frequency of vibration, the combination with said pipe line span of a compression spring disposed around at least one of the linking members at one end of the strut, and means for compressing the spring to urge that end of the strut and the adjacent plate together and increase the internal dampening capacity of the span and thereby alter its natural frequency of vibration.

2. Apparatus according to claim 1 which includes means for adjusting the compressive force exerted by the spring.

3. Apparatus according to claim 1 which includes washer means disposed around the linking member having the spring, the washer being between the respective plate and strut.

References Cited in the file of this patent

UNITED STATES PATENTS

| | | |
|---|---|---|
| 619,999 | Sherman | Feb. 21, 1899 |
| 749,413 | Warwick | Jan. 12, 1904 |
| 2,010,576 | Whyte | Aug. 6, 1935 |
| 2,013,195 | Ward | Sept. 3, 1935 |
| 2,736,334 | Riley et al. | Feb. 28, 1956 |